(12) United States Patent
Altemose

(10) Patent No.: US 10,374,440 B2
(45) Date of Patent: Aug. 6, 2019

(54) SYSTEM AND METHOD FOR SUPERCAPACITOR CHARGING AND BALANCING

(71) Applicant: Rockwell Collins, Inc., Cedar Rapids, IA (US)

(72) Inventor: George Altemose, Setauket, NY (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 139 days.

(21) Appl. No.: 15/630,172

(22) Filed: Jun. 22, 2017

(65) Prior Publication Data

US 2018/0375345 A1    Dec. 27, 2018

(51) Int. Cl.
*H02J 7/00* (2006.01)
*H01G 11/00* (2013.01)

(52) U.S. Cl.
CPC ............ *H02J 7/0014* (2013.01); *H01G 11/00* (2013.01)

(58) Field of Classification Search
CPC ...................................... H02J 7/0014
USPC ......................................... 320/166
See application file for complete search history.

(56) References Cited

U.S. PATENT DOCUMENTS

| 5,659,237 | A | * | 8/1997 | Divan | ................... | H02J 7/0018 320/119 |
| 6,664,766 | B2 | | 12/2003 | Desprez et al. | | |
| 8,058,844 | B2 | * | 11/2011 | Altemose | ............. | H02J 7/0016 320/118 |
| 2003/0214267 | A1 | | 11/2003 | Long | | |
| 2009/0273321 | A1 | * | 11/2009 | Gotzenberger | ....... | H02J 7/0018 320/166 |
| 2010/0039072 | A1 | * | 2/2010 | Cegnar | .................. | H01G 9/155 320/167 |
| 2012/0062038 | A1 | * | 3/2012 | Wang | .................... | H02J 7/0018 307/82 |
| 2013/0049778 | A1 | | 2/2013 | Yang et al. | | |
| 2014/0139184 | A1 | * | 5/2014 | De Vries | ............... | H02J 7/0016 320/116 |
| 2016/0126826 | A1 | | 5/2016 | Chao | | |
| 2016/0204627 | A1 | | 7/2016 | Wang | | |

FOREIGN PATENT DOCUMENTS

WO    2016054925 A1    4/2016

OTHER PUBLICATIONS

International Search Report and Written Opinion dated Sep. 12, 2018 for PCT/US18/39092.

* cited by examiner

*Primary Examiner* — Edward Tso
*Assistant Examiner* — Ahmed H Omar
(74) *Attorney, Agent, or Firm* — Angel N. Gerdzhikov; Donna P. Suchy; Daniel M. Barbieri

(57) ABSTRACT

In an illustrative embodiment, a supercapacitor system includes a common bus and a number of supercapacitor units, each of the supercapacitor units including one or more supercapacitors, coupled to the common bus via a balancing circuit, where each balancing circuit is configured to balance a charge of the one or more supercapacitors in the supercapacitor units by conducting current to supercapacitor units with a lower charge from supercapacitor units with a higher charge over the common bus, each balancing circuit including at least a first switch and a second switch, each switch controlled by a clock signal.

12 Claims, 5 Drawing Sheets

SYSTEM AND METHOD FOR SUPERCAPACITOR CHARGING AND BALANCING

RELATED APPLICATIONS

This application incorporates by reference, in its entirety, the following prior patent application by B/E Aerospace, Inc. directed to devices and methods for charging and balancing battery cells: U.S. Pat. No. 8,058,844 entitled "Low Power Battery System" and issued Nov. 15, 2011.

BACKGROUND

Many electronic systems require protection from unexpected interruption of power. Supercapacitors have become widely used for applications requiring energy storage. Compared to conventional capacitors, supercapacitors provide superior energy density. Compared to battery cells, supercapacitors can often provide larger peak discharge currents and may be fully discharged without damage. One limitation of supercapacitors is their maximum rated voltage, which is typically 2.7 V. Many applications require voltages higher than 2.7 V, e.g. 12 V to 24 V. To meet this requirement, a bank of supercapacitors may be formed by connecting a number of supercapacitors in series. If N supercapacitors are connected in series, the rated voltage of the bank is N×2.7 V. For example, if N=5, a bank of five supercapacitors has a rating of 13.5 V. As is the case with the parameters of any electronic component, the actual capacitance of a supercapacitor has a manufacturing tolerance. For a supercapacitor, the tolerance of the capacitance is typically ±10% or ±20%. Thus, for a supercapacitor nominally specified to be 100 F, ±20%, the actual capacitance may be any value between 80 F and 120 F. This tolerance is significant with regard to charging and/or discharging a bank of supercapacitors connected in series. In common practice, a single charging circuit is used to supply current into the top (most positive) supercapacitor in the bank. Because the supercapacitors are in series, the same current flows into all of the supercapacitors, causing them to charge. Ideally, the charging process is described by the following equation:

$$V = It/C \quad (1)$$

where V is the voltage on each supercapacitor, I is the charging current, assumed to be constant, t is the elapsed time, and C is the capacitance.

Therefore, in a series string, if all of the capacitances are equal, all of the capacitor voltages are likewise equal. However, in practice, this fortuitous circumstance is precluded by the mismatch of the capacitance values due to the manufacturing tolerances. If, for example, one supercapacitor has a value that is 20% high and another supercapacitor has a value that is 20% low, the voltage difference at any time during the charging cycle is 40%. This may pose a problem if the charging process is controlled by measuring the total voltage across the series bank, with the charging terminated when a predetermined limit is reached. For example, consider a bank of five capacitors to be charged to 13.5 V. If the charging is controlled simply by checking the total voltage, and terminated when this voltage reaches 13.5 V, it is very likely that some of the series capacitors may have voltages less than 2.7 V, and other may have voltages greater than 2.7 V, although the average may be equal to 2.7 V. This is a very serious problem, because the individual supercapacitors are said to be "not forgiving," in the sense that they are likely to be irreparably damaged by voltages exceeding 2.7 V. This issue is known and several precautionary steps are commonly used to address the problem. For example, the charging process may be terminated at a lower voltage. In the example described above, this might be 12 V, instead of 13.5 V. While this technique may prevent damage to the individual supercapacitors, it has the disadvantage that the maximum possible amount of energy storage is not achieved. The stored energy is given by the following equation:

$$W = \tfrac{1}{2}CV2 \quad (2)$$

where W is the energy, in joules, C is the capacitance, in farads, and V is the capacitor voltage, in volts.

While using a single charger to provide a charging current to the series string, a balancing circuit may be added to force the voltages on all of the supercapacitors to be equal. This technique is widely used, and numerous circuits are available to provide this capability. Typically, these circuits measure the individual supercapacitor voltages, and turn on external shunt resistors to discharge the supercapacitors with the highest voltages, eventually forcing all of the voltages to become equal to the lowest voltage.

Instead of a single charger for the entire bank, individual isolated, or floating, chargers may be used for each supercapacitor. Each charger charges one supercapacitor to its full voltage, which is 2.7 V.

Supercapacitors are similar in many respects to lithium-ion battery cells, although lithium-ion cells are used to a much greater extent. A great deal of technology has been developed specifically for charging and balancing lithium-ion batteries, including low-cost integrated circuits. Like supercapacitors, lithium-ion cells are also "not forgiving" with regard to being overcharged, with a rated voltage near 4.0 V, rather than 2.7 V. Furthermore, lithium-ion cells have an additional problem, which is they must not go into deep discharge, which is the condition of being discharged to near zero volts. In general, if a lithium-ion cell is overcharged (>4V), it may go into thermal runaway and catch fire or explode. If it is subjected to deep discharge (near 0 V), it may short circuit, and cannot be recharged, and therefore becomes unusable.

Method and devices for the balancing of lithium-ion cells are described in U.S. Pat. No. 8,058,844 entitled "Low Power Battery System" and issued Nov. 15, 2011, incorporated herein by reference in its entirety. The primary limitation is that it does not work for very low voltages, e.g. less than 1.5 V or so. That is acceptable for lithium-ion cells, but not for supercapacitors, which can be fully discharged, down to 0 V.

SUMMARY OF ILLUSTRATIVE EMBODIMENTS

The forgoing general description of the illustrative implementations and the following detailed description thereof are merely exemplary aspects of the teachings of this disclosure, and are not restrictive.

Cell balancing and charging systems provide the ability to charge a series connection of storage cells using a single source. Systems using supercapacitor cells often require balancing of individual cells in order to maximize the energy available from the supercapacitors and to prolong the life of the system. In certain embodiments, the system described herein provides a drive circuit that works down to 0V.

Cell balancing and charging systems provide, in certain embodiments, the ability to charge a series connection of storage cells using a single source. Certain embodiments of the disclosed system may be used in power supplies that operate during a dropout of the input voltage, typically for a period of 50 to 100 milliseconds with a power output of several hundred watts. Supercapacitors are well suited for such power supplies because the power density of supercapacitors is much larger than the power density of conventional capacitors. This can result in a significant savings in the weight and size of the complete unit.

In one aspect, a supercapacitor system is disclosed that includes a common bus and a plurality of supercapacitor units, each of the plurality of supercapacitor units including one or more supercapacitors, coupled to the common bus via a balancing circuit, wherein each balancing circuit is configured to balance a charge of the one or more supercapacitors in the plurality of supercapacitor units by conducting current to supercapacitor units with a lower charge from supercapacitor units with a higher charge over the common bus, each balancing circuit including at least a first switch and a second switch, each switch controlled by a clock signal.

In a second aspect, a method for charging and balancing a plurality of supercapacitors units is disclosed that where the method includes coupling the plurality of supercapacitor units to a common bus via a balancing circuit, each of the plurality of supercapacitor units including one or more supercapacitors and configuring each balancing circuit to balance the charge of the plurality of supercapacitors units by conducting current to lower charge supercapacitors units from higher charge supercapacitors units over the common bus, each balancing circuit including at least a first switch and a second switch, each switch controlled by a clock signal.

In a third aspect, a supercapacitor charge balancing circuit is disclosed that includes a supercapacitor having a first terminal and a second terminal, a common bus, a first switch having a first terminal electrically coupled to the first terminal of the supercapacitor, a second terminal electrically coupled to the common bus and a control terminal electrically coupled to a first clock signal, a second switch having a first terminal electrically coupled to the common bus, a second terminal electrically coupled to the second terminal of the supercapacitor and a control terminal electrically coupled to a second clock signal and wherein a phase of the first clock signal does not overlap a phase of the second clock signal.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
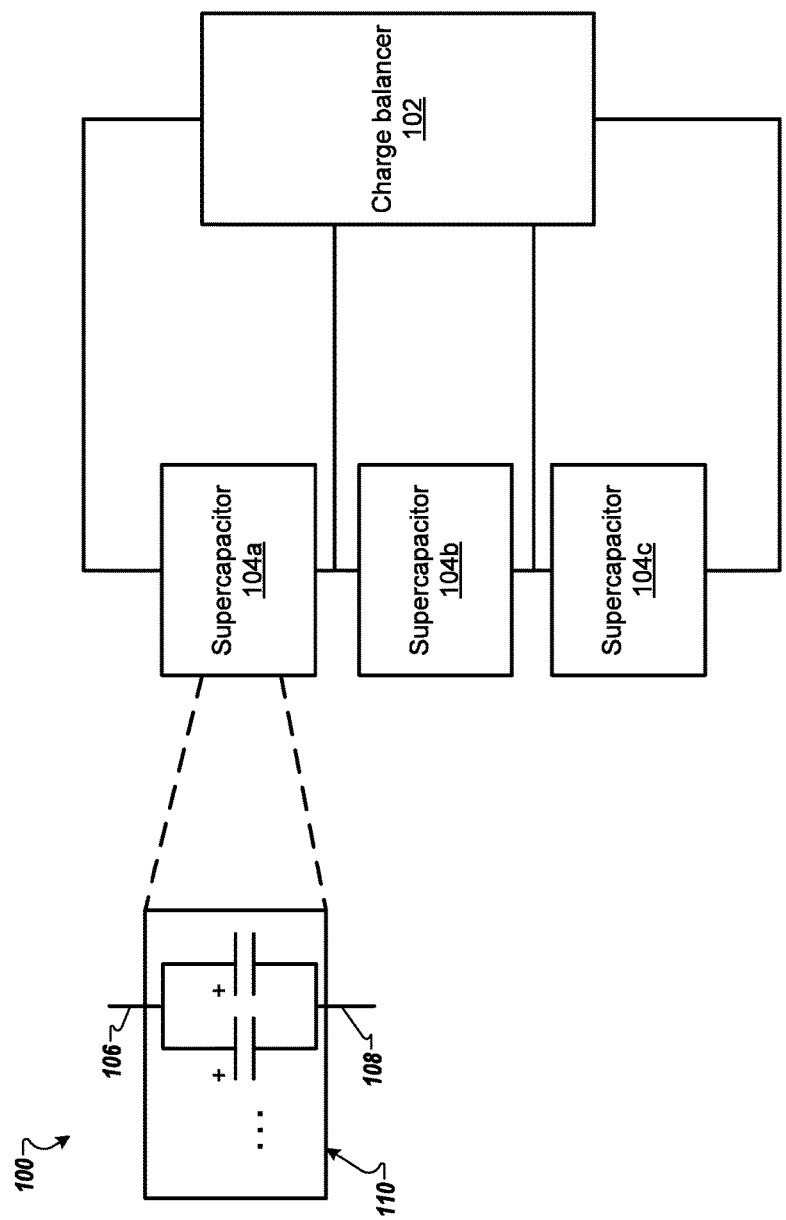
FIG. 1 is a block diagram illustrating the connection of a supercapacitor balancing system with a series connection of supercapacitor units according to some embodiments.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 is a block diagram illustrating the connection of a supercapacitor balancing system with a series connection of supercapacitor units according to some embodiments. In FIG. 1, there is illustrated a supercapacitor charging and balancing system 100. The supercapacitor charging and balancing system 100 may include a charge balancer 102 which is connected with a series of supercapacitors 104. The charge level on a particular supercapacitor 104a, 104b or 104c may be moved from one supercapacitor to another in order to balance the charge load across each of the supercapacitors 104. Each of the supercapacitors 104 may include one or more individual supercapacitors connected in parallel to form a virtual supercapacitor, as shown in inset 110. Each of the supercapacitors 104 may be included in a supercapacitor pack arranged in various series and/or parallel combination.

Charge balancer 102 may operate by comparing the relative voltage levels of supercapacitors 104, and compensating supercapacitors 104 with a lower charge with energy from the higher voltage supercapacitor. For example, if each of the supercapacitors 104 maintains a voltage level of approximately 2.7 volts, but there is one supercapacitor that has a voltage lower than 2.7 volts, current may flow from the 2.7 volt supercapacitors to the lower voltage supercapacitors until all supercapacitors are approximately the same voltage level. This would be a simple circuit if the supercapacitor plus terminals 106 were each coupled to a share a bus through a resistor, and the supercapacitor minus terminals 108 were coupled to ground. However, where the supercapacitors 104 are connected in series, and therefore, the low sides of the supercapacitors are not tied to ground, the same effect may be achieved through capacitor coupling.

Figure 2:
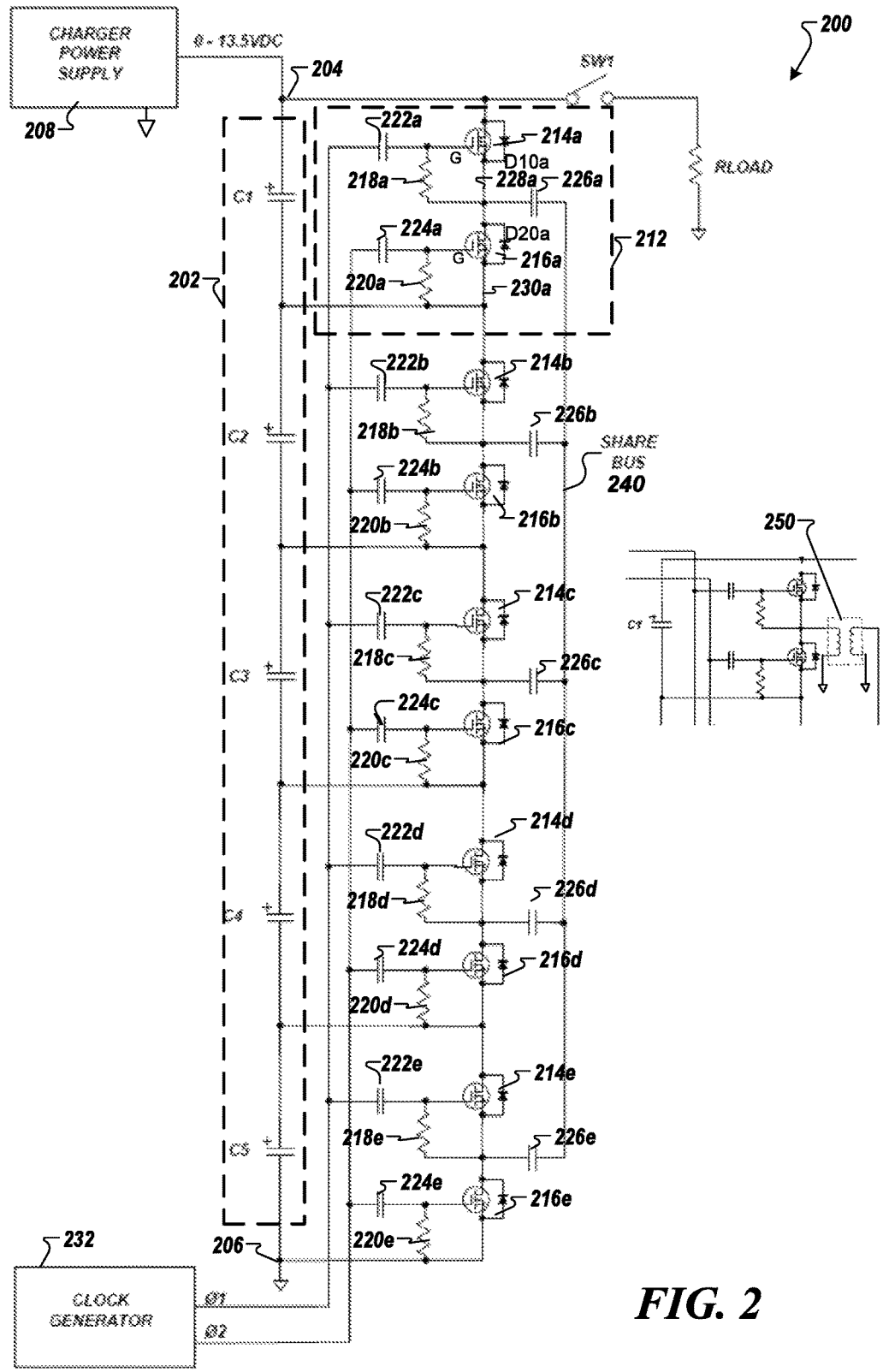
FIG. 2 is a schematic diagram of a supercapacitor balancing system with a DC-coupled charger according to some embodiments.

FIG. 2 illustrates a circuit 200 for providing charging and balancing of a series connection of supercapacitors 202 according to some embodiments of the present disclosure. Supercapacitors 202 are connected between an input voltage node 204 and a ground node 206. A charging voltage is supplied to supercapacitors 202 by charger power supply 208 between node 204 and node 206. The circuit 200 includes one or more charge balancers 212. In some embodiments, the number of charge balancers 212 is equal to the number of supercapacitors 202.

The following description provides details of one of the charge balancers 212 (for supercapacitor C1). Charge balancer 212 may include transistors 214a and 216a, resistors 218a and 220a, and capacitors 222a, 224a, and 226a. In the implementation illustrated in FIG. 2, transistors 214a and 216a are shown as MOSFETS, but other types of electronically controlled switching devices (switches) may also be used. In some implementations, transistors 214a and 216a may be bipolar junction transistors. The transistor 214a has its drain/source path connected between the "+" node of supercapacitor C1 (node 204) and node 228a. The transistor 216a has its drain/source path connected between node 228a and node 230a (i.e., the negative node of supercapacitor C1). The supercapacitor "+" terminal of a second supercapacitor (e.g., C2) is connected to node 230a.

In some embodiments, the gate (G) terminal of transistor 214a may be driven by a rectangular wave (e.g., approximately 100 KHz) having, for example, a duty cycle somewhat less than 50%.

The square wave may be generated by clock generator 232. When transistor 214a activates (e.g., when the gate drive is positive), the output from each transistor will be a square wave with a peak-to-peak amplitude equal to the voltage of the supercapacitor that powers it. All of the transistor outputs are connected to a common bus (share bus 240) through capacitor 226 (e.g., with a value of 1 uf).

Figure 4:
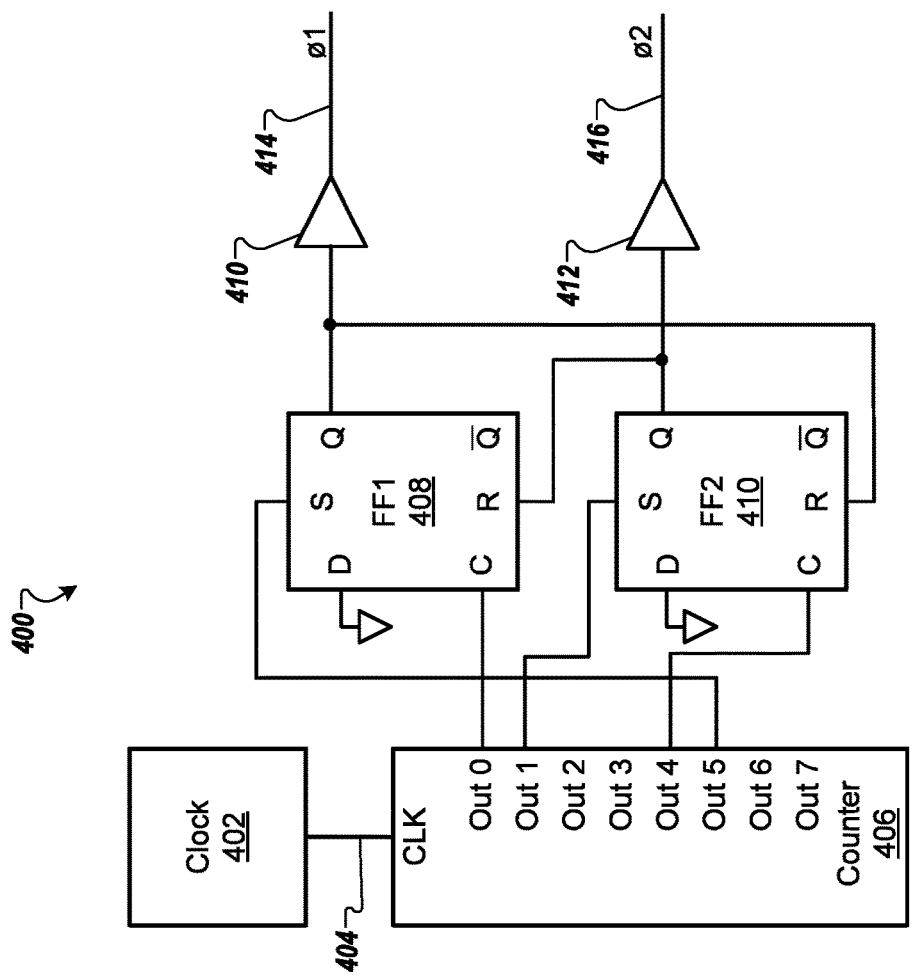
FIG. 4 is a functional schematic of a clock generator circuit of a supercapacitor balancing system according to some embodiments.

In some embodiments, the gate (G) of each transistor 216a may be driven by a rectangular wave (e.g., approximately 100 KHz) having, for example, a duty cycle somewhat less than 50%. In some embodiments, clock generator 232 is a two phase clock circuit. An exemplary clock generator 232 is shown in FIG. 4 and is described below.

Diodes D10a and D20a may, in some embodiment, be internal to the transistors 214a and 216a, respectively, and may be connected in anti-parallel with transistors 214a and 216a.

Capacitors 222a and 224a which may, in some embodiments, each have a value of approximately 0.01 uf. Resistors 218a and 220a may, in some embodiments, each have the value 10K$\Omega$. However, the actual values may vary depending on the application. For example, in some embodiments the values of these components may depend on the maximum supercapacitor voltage. The value of capacitor C226a may be a function of the balancing current such that C226a has a low impedance (less than 1$\Omega$) at the clock frequency. During operation, if all supercapacitors 202 (e.g., C1, C2, C3, C4, and C5) are exactly equal in voltage, then the square waves of each transistor will have identical peak-to-peak voltages, and no current will flow. However if a certain capacitor has a charge that is lower than the others, its square wave would also be lower, and current would therefore flow through the share bus from the higher charged supercapacitors into the lower charged supercapacitor. The on resistance RDS (ON) of the transistors 214 and 215, in some embodiments, may be less than 10 m$\Omega$ (0.01$\Omega$).

The charging and balancing circuit 200 provides high efficiency (i.e., close to 100%).

In some implementations, the charging energy source may be a DC source coupled directly into a share bus, where it may be distributed directly to the series of supercapacitors, thereby performing the charging and balancing functions simultaneously. This differs from the process in the prior art, in which the charger supplies current into the (+) side of the most positive supercapacitor, and the balancing circuit is used only to redistribute the charge among the series elements. This may lead to problems. For example, if the charger is turned on, but the balancing circuit is not connected, or is turned off, or does not have sufficient current-carrying capability, it is possible that the series supercapacitors may not be adequately balanced. This may cause the smallest supercapacitor (i.e., the capacitor with the lowest capacitance) to become overcharged and thereby become damaged. In the charging process (without balancing), the same charging current flows from the charger through each of the series supercapacitors. In accordance with equation (1), since the current (I) through each supercapacitor is identical, the voltage of each supercapacitor is inversely proportional to its capacitance (C). Thus, for example, if one capacitance is 20% lower than the average capacitance, its voltage is 20% higher than the average voltage.

Figure 3:
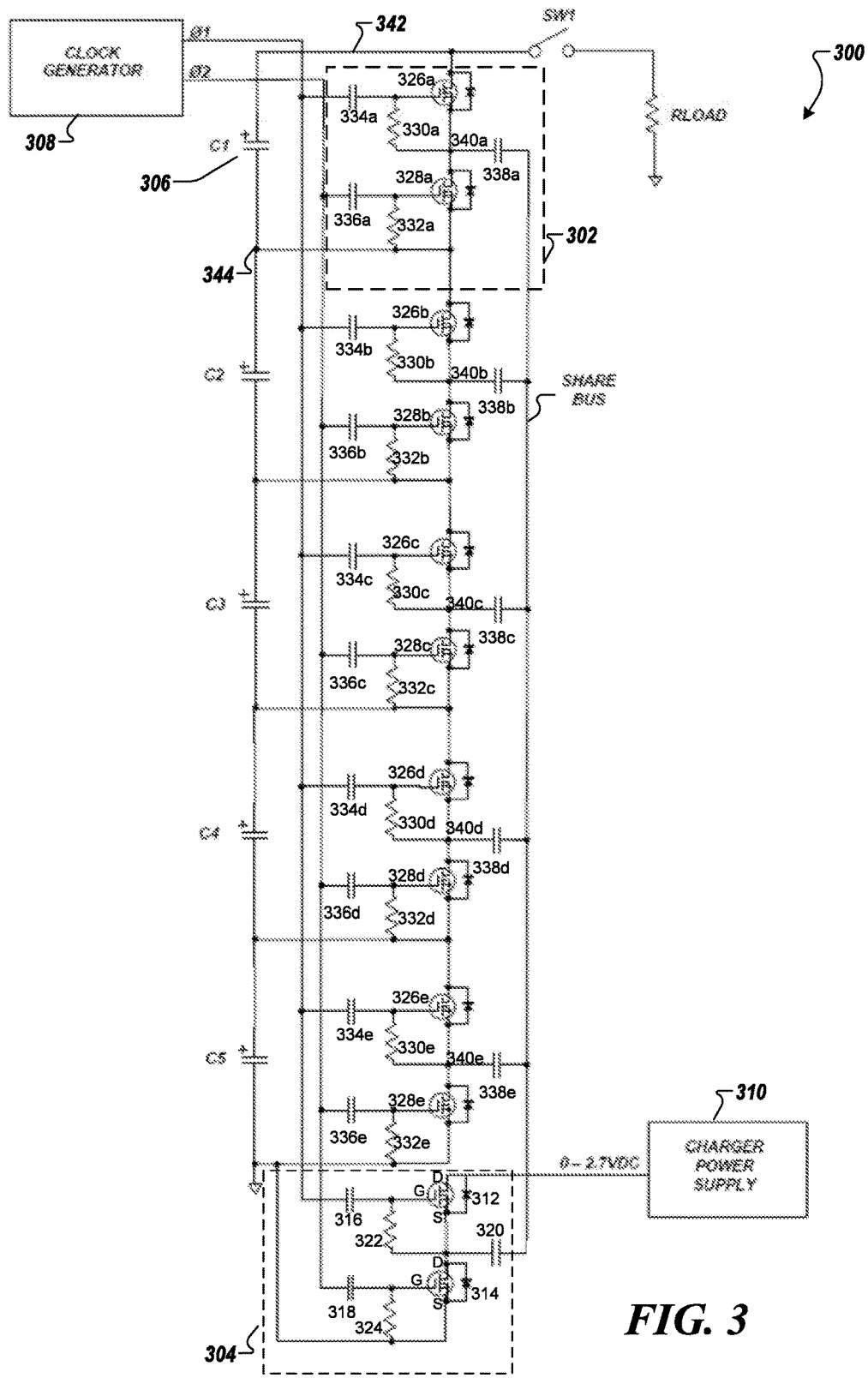
FIG. 3 is a schematic diagram of a supercapacitor balancing system with an AC-coupled charger according to some embodiments.

FIG. 3 illustrates a circuit 300 for providing charging and balancing of a series connection of supercapacitors according to other embodiments of the present disclosure. In FIG. 3 the supercapacitor charging and balancing system 300 may include an AC-coupled charger. The supercapacitor charging and balancing system 300 may include charge balancer 302, charging circuit 304, a series of supercapacitors 306, a clock generator 308, and a charger power supply 310.

The output of charger power supply 310 may, in some embodiments, be in the range of 0V-2.7V and may be connected to the charging circuit 304.

In some embodiments, charging power supply 310 may act, electrically, as one of the supercapacitors (i.e., starts as a supercapacitor with the highest voltage in the configuration). Thus, the current may flow from the charging power supply 310 to the supercapacitors 306 until all supercapacitors are charged and have approximately the same voltage level. The charging circuit 304 may include transistors 312 and 314, resistors 322 and 324, and capacitors 316, 318 and 320. In the implementation illustrated in FIG. 3, transistors 312 and 314 are shown as MOSFETS. In other implementations, transistors 312 and 314 may be bipolar junction transistors. Transistors 312 and 314 may be driven by corresponding phase outputs of clock generator 308. Resistor 322 bridges the gate (G) and source (S) of transistor 312. Resistor 324 bridges the gate (G) and source (S) of transistor 314. The source (S) of transistor 314 may be connected to the ground terminal of the supercapacitor series string. Transistor 312 may have its drain/source path connected between the charger power supply 310 and the drain (D) of transistor 314. Transistor 314 may have its drain/source path connected between the source (S) of transistor 312 and the ground.

The charge balancer 302 may include transistors 326a and 328a, resistors 330a and 332a, and capacitors 334a, 336a, and 338a. The transistor 326a may have its source/drain path connected between node 340a and supercapacitor plus terminal 342. The transistor 328a may have its source/drain path connected between the supercapacitor negative terminal 344 and node 340.

The AC coupled share bus transfers charge from the supercapacitors with voltages higher than the average to supercapacitors with voltages below the average. This topology provides very high efficiency, not attainable with prior art circuits. The AC-coupled charger allows the supercapacitors to be charged in parallel (rather than in series), which tends to prevent overcharging.

In other embodiments, a transformer coupled balancing circuit instead of a capacitor coupled balancing circuit may be utilized. For example, the inset circuit in FIG. 2 illustrates the use of a transformer 250 in place of the coupling capacitor 226 in the charge balancers 212.

In one embodiment, the output voltage of the charger power supply 310 may be based on type of the supercapacitor 306. The maximum output voltage may be equal to the rated voltage of the supercapacitor. When the rated voltage of the supercapacitor is 2.7 volts, the output voltage may be equal to 2.7 volts.

Figure 5:
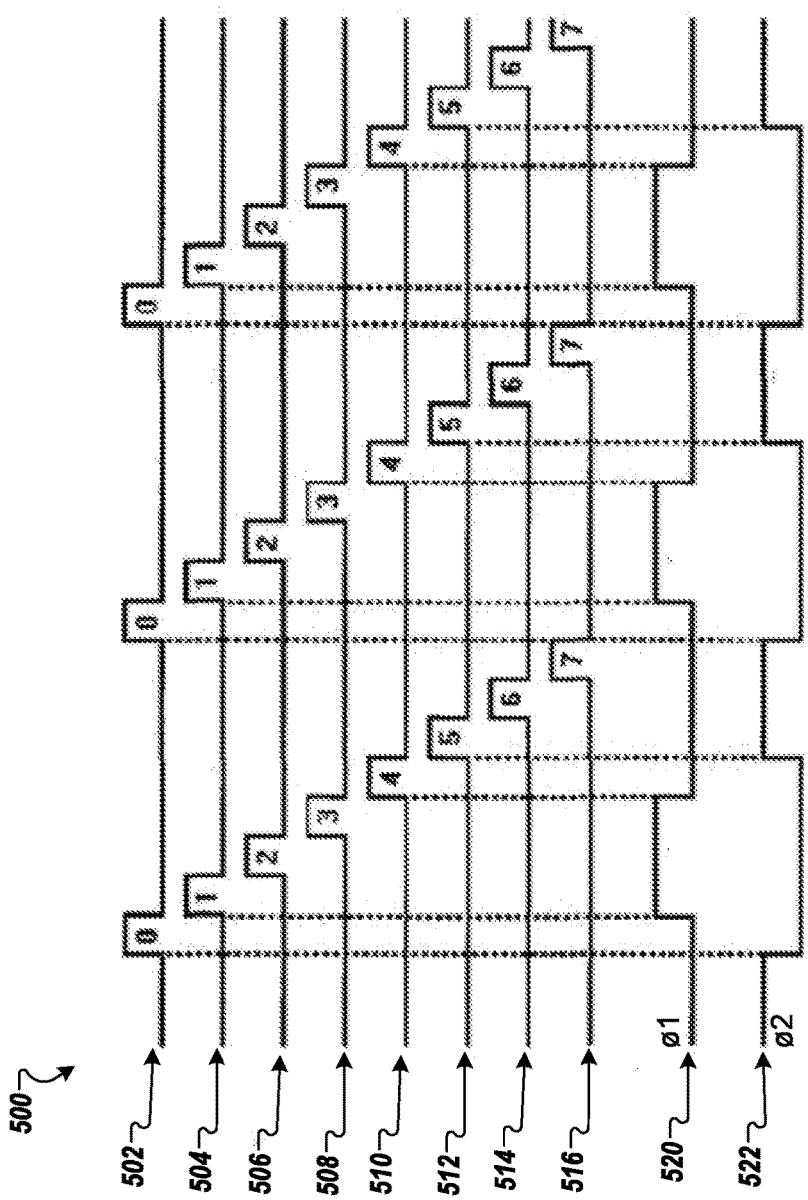
FIG. 5 is an exemplary timing chart of a clock generator circuit according to some embodiments.

A clock generator 232 usable, for example, with the charging and balancing circuit 200 of FIG. 2 or clock generator 308 usable, for example, with charging and balancing circuit 300 of FIG. 3 is now disclosed with reference to FIGS. 4 and 5.

FIG. 4 is a functional schematic of a clock generator circuit 400 of a supercapacitor balancing system according to some embodiments. This circuit may employ various circuit functions in order to create an appropriate clock signal. These circuit functions may cooperate to create a two phase clock which may drive the exemplary charge balancer 212 of FIG. 2, charge balancer 302 of FIG. 3 and the charging circuit 304 of FIG. 3. FIG. 5 illustrates a timing diagram 500 that shows various signals that may be found in the circuitry illustrated in FIG. 4.

Referring now to FIG. 4, clock 402 may include an oscillator circuit, known in the art, to generate a clock signal 404. While the exact frequency of clock signal 404 generated by clock 402 may not be critical, in some embodiments, clock signal 404 may be approximately 800 kHz. Clock signal 404 may drive the clock input (CLK) of counter 406. Counter 406 may be, for example, a four-bit octal Johnson Counter with eight fully decoded outputs. An example of such a counter is the CD4022B manufactured and sold by Texas Instruments, among other manufacturers. Counter 406 produces eight output signals (Out 0 through Out 7) with a so-called "one-hot" coding, where only a single output is high (1) while and all the others are low (0). FIG. 5 illustrates an example of the eight output signals 502 through 516 of counter 406. Flip-flops 408 and 409 may be well known D-Type flip-flops with asynchronous set-reset capability. An example of such flip-flops is the CD4013B manufactured and sold by Texas Instruments, among other manufacturers. In some embodiments, Out 0 of counter 406 may drive the clock input (C) of flip-flop 408, Out 1 of counter 406 may drive the set input (S) of flip-flop 410, Out 4 of counter 406 may drive the clock input (C) of flip-flop 410, and Out 5 of counter 406 may drive the set input (S) of flip-flop 408. The D inputs (D) of flip-flops 408 and 410 may be wired to a low (0) level. This configuration may produce two clock signals with non-overlapping high (1) levels, as illustrated in FIG. 5 ø1 of 520 and ø2 522. The output (Q) of flip-flop 408 may be fed into driver/buffer 410 to create the ø1 signal 414. The output (Q) of flip-flop 410 may be fed into driver/buffer 412 to create the ø1 signal 416.

Timing diagram 500 emphasizes the non-overlapping high (1) levels of the clock phases (e.g., shown in output signals 520 and 522). This aspect of the two clock phases may help to prevent the simultaneous conduction of the paired transistors (switches) in each of the balancing circuits in FIGS. 2 and 3. In addition, flip-flops 408 and 410 in FIG. 4 are shown in a crossed coupled configuration (e.g., the "Q" output of each device is coupled to the reset (R) input of the other device). Cross coupling these devices may, for example, prevent both Q outputs from being high (1) at any time, especially during startup, to ensure that only one transistor of each pair in activated at a time.

While discrete circuits are discussed herein for the sake of explanation, the present disclosure may also be implemented as a single custom or semi-custom integrated circuit or gate-array, for example.

Any of the previously discussed circuit embodiments may be constructed on a small circuit board or, as previously mentioned, as a monolithic device, and may further be mounted inside the housing of a supercapacitor (e.g., 306 of FIG. 3). As a result, it would be beneficial for the circuit to be physically small, light in weight, and very low in cost.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A supercapacitor system, comprising:
   a DC power supply;
   a clock generator, the clock generator including:
      an oscillator circuit;
      a counter which receives a clock input signal from the oscillator circuit;
      a first D type flip flop coupled to the counter; and a second D type flip flop coupled to the counter, wherein the output of the first D type flip flop is fed to a first buffer and provides the first phase of the clock signal and the second D type flip flop is fed to a second buffer and provides the second phase of the clock signal;

a DC common bus; and a plurality of supercapacitor units, wherein all of the plurality of supercapacitor units are electrically coupled in series, each of the plurality of supercapacitor units including one or more supercapacitors, coupled to the DC common bus via a balancing circuit, wherein the balancing circuit is configured to balance a charge of the one or more supercapacitors in the plurality of supercapacitor units by conducting current to supercapacitor units with a lower charge from supercapacitor units with a higher charge over the DC common bus, the DC power supply coupled directly to the DC common bus, and the balancing circuit includes at least a first switch and a second switch, each switch controlled by a clock signal provided by the clock generator, the clock generator configured to provide a first phase of the clock signal for the first switch which does not overlap a second phase of the clock signal from the second switch.

2. The supercapacitor system of claim 1, wherein the first switch and the second switch are MOSFET transistors.

3. The supercapacitor system of claim 1, wherein the first switch and the second switch are bipolar junction transistors.

4. The supercapacitor system of claim 1, wherein each balancing circuit of the plurality of supercapacitor units is capacitively coupled to the DC common bus.

5. The supercapacitor system of claim 1, wherein each balancing circuit of the plurality of supercapacitor units is coupled to the DC common bus via a transformer.

6. The supercapacitor system of claim 1, wherein the DC charger power supply has a maximum voltage equal to a rated voltage of the one or more supercapacitors in the plurality of supercapacitor units.

7. The supercapacitor system of claim 1, wherein the each of the plurality of supercapacitor units further includes a housing, the housing being configured to contain the one or more supercapacitors and the supercapacitor balancing circuit.

8. The supercapacitor system of claim 1, wherein the one or more supercapacitors in each of the plurality of supercapacitors are electrically coupled in parallel to form a virtual supercapacitor.

9. The supercapacitor system of claim 1, wherein each supercapacitor balancing circuit of plurality of supercapacitor units is configured to allow current to flow over the DC common bus from supercapacitor units with a higher charge to supercapacitor units with a lower charge until all of the supercapacitor units have the same charge.

10. The supercapacitor system of claim 1, wherein the counter is a four-bit octal johnson counter.

11. The supercapacitor system of claim 1, wherein the output of the first D type flip flop is coupled to a reset of the second D type flip flop and the output of the second D type flip flop is coupled to a reset of the first D type flip flop to ensure the first phase of the clock signal does not overlap the second phase of the clock signal.

12. The supercapacitor system of claim 1, wherein the clock input signal is approximately 800 kHZ.

* * * * *